(12) United States Patent
Rahmes et al.

(10) Patent No.: US 12,417,624 B2
(45) Date of Patent: Sep. 16, 2025

(54) CHANGE DETECTION DEVICE AND RELATED METHODS

(71) Applicant: EAGLE TECHNOLOGY, LLC, Melbourne, FL (US)

(72) Inventors: Mark D. Rahmes, Melbourne, FL (US); Glenn Boudreaux, Melbourne, FL (US); William W. Watkins, Melbourne Beach, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 537 days.

(21) Appl. No.: 18/048,528

(22) Filed: Oct. 21, 2022

(65) Prior Publication Data

US 2024/0135694 A1    Apr. 25, 2024
US 2024/0233354 A9    Jul. 11, 2024

(51) Int. Cl.
*G06V 10/82* (2022.01)
*G06V 10/764* (2022.01)
*G06V 20/10* (2022.01)

(52) U.S. Cl.
CPC ............ *G06V 10/82* (2022.01); *G06V 10/764* (2022.01); *G06V 20/10* (2022.01)

(58) Field of Classification Search
CPC ....... G06V 10/82; G06V 20/10; G06V 10/764
See application file for complete search history.

(56) References Cited

U.S. PATENT DOCUMENTS

| | | | |
|---|---|---|---|
| 10,616,257 B1 | 4/2020 | Soulhi et al. | |
| 10,643,131 B1 | 5/2020 | Matthey-de-l'Endroit et al. | |
| 10,665,251 B1 | 5/2020 | Wood, III et al. | |
| 10,848,508 B2 | 11/2020 | Chen et al. | |
| 10,931,700 B2 | 2/2021 | Soulhi et al. | |
| 11,238,307 B1 | 2/2022 | Delay et al. | |
| 11,302,071 B1 | 4/2022 | Boudreaux | |
| 12,198,337 B2 * | 1/2025 | Liu | G06V 10/778 |
| 2019/0026631 A1 | 1/2019 | Carr et al. | |
| 2020/0363815 A1 * | 11/2020 | Mousavian | G06T 7/75 |
| 2021/0397945 A1 | 12/2021 | Vahdat et al. | |

(Continued)

FOREIGN PATENT DOCUMENTS

| | | |
|---|---|---|
| CN | 108154495 | 6/2018 |
| CN | 108932705 | 12/2018 |

(Continued)

OTHER PUBLICATIONS

Chen et al. "Unsupervised Anomaly Detection of Industrial Robots Using Sliding-Window Convolutional Variational Autoencoder" IEEE Access: 0.1109/ACCESS.2020.2977892 Mar. 3, 2020; pp. 10.

(Continued)

*Primary Examiner* — Utpal D Shah
(74) *Attorney, Agent, or Firm* — ALLEN, DYER, DOPPELT, + GILCHRIST, P.A. Attorneys at Law (57) ABSTRACT

A change detection device may include a variational autoencoder (VAE) configured to encode image data to generate a latent vector, and decode the latent vector to generate new image data. The change detection device may further include a controller configured to select a deep learning model from different deep learning models based upon the new image data and a game theory reward matrix, and process the new image data using the selected deep learning model to detect changes therein.

21 Claims, 9 Drawing Sheets

(56) References Cited

U.S. PATENT DOCUMENTS

| | | | |
|---|---|---|---|
| 2022/0091259 A1 | 3/2022 | Hucks | |
| 2022/0092812 A1 | 3/2022 | Boudreaux | |
| 2022/0215619 A1 | 7/2022 | Lieb | |
| 2022/0300585 A1* | 9/2022 | Mudumba | G06F 18/217 |
| 2023/0090743 A1* | 3/2023 | Pinto | G06T 7/10 |
| | | | 382/141 |
| 2023/0186482 A1* | 6/2023 | Rahmes | G08G 5/70 |
| | | | 382/199 |
| 2023/0244915 A1* | 8/2023 | Rahmes | G06N 3/045 |
| | | | 706/15 |
| 2024/0112448 A1* | 4/2024 | Arief | G06T 11/00 |

FOREIGN PATENT DOCUMENTS

| | | |
|---|---|---|
| CN | 109191402 | 1/2019 |
| CN | 113222972 | 8/2021 |
| JP | 2019075108 | 5/2019 |
| JP | 2020154561 | 9/2020 |
| WO | WO2021205669 | 10/2021 |

OTHER PUBLICATIONS

Amini et al. "Variational Autoencoder for End-to-End Control of Autonomous Driving with Novelty Detection and Training Debiasing" 2018 IEEE/RSJ International Conference on Intelligent Robots and Systems (IROS); 2018; pp. 8.

An et al. "Variational Autoencoder based Anomaly Detection using Reconstruction Probability" SNU Data Mining Center 2015-2 Special Lecture on IE; pp. 18.

Daudt et al. "Urban Change Detection for Multispectral Earth Observation Using Convolutional Neural Networks" IGARSS 2018: pp. 4.

Fan et al. "Video Anomaly Detection and Localization via Gaussian Mixture Fully Convolutional Variational Autoencoder" https://arxiv.org/abs/1805.11223; May 29, 2018; pp. 13.

Gong et al. "Memorizing Normality to Detect Anomaly: Memory-augmented Deep Autoencoder for Unsupervised Anomaly Detection" https://arxiv.org/abs/1904.02639; Aug. 6, 2019; pp. 10.

Kiwachi et al. "Complementary Set Variational Autoencoder for Supervised Anomaly Detection," 2018 IEEE International Conference on Acoustics, Speech and Signal Processing (ICASSP), 2018, pp. 2366-2370.

Kingma et al. "Auto-Encoding Variational Bayes" Computer Science 2013; pp. 14.

Li et al "Anomaly Detection of Time Series with Smoothness-Inducing Sequential Variational Auto-Encoder" Journal of Latex Class Files, vol. 14, No. 8, Aug. 2018; pp. 15.

Memarzadeh et al. "Unsupervised Anomaly Detection in Flight Data Using Convolutional Variational Auto-Encoder" Aerospace 2020, 7, 115; pp. 19.

Zerrouki et al. "Desertification Detection using an Improved Variational AutoEncoder-Based Approach through ETM-Landsat Satellite Data" in IEEE Journal of Selected Topics in Applied Earth Observations and Remote Sensing, 2020, vol. 14; pp. 14.

Norlando et al. "Latent space conditioning for improved classification and anomaly detection" https://arxiv.org/abs/1911.10599; 2019; pp. 18.

Sun et al. "Learning Sparse Representation With Variational Auto-Encoder for Anomaly Detection" IEEE Access Special Section on Novel Learning Applications and Services for Smart Campus: vol. 6, 2018; pp. 9.

Wiewel et al. "Continual Learning for Anomaly Detection With Variational Autoencoder" ICASSP 2019; pp. 5.

Xu et al. "Unsupervised Anomaly Detection via Variational Auto-Encoder for Seasonal KPIs inWeb Applications" WWW '18: Proceedings of the 2018 World Wide Web Conference Apr. 2018; pp. 10.

Yan et al. "Abnormal Event Detection From Videos Using a Two-Stream Recurrent Variational Autoencoder" IEEE Transactions on Cognitive and Developmental Systems, vol. 12, No. 1, Mar. 2020; pp. 30.

Zavrak et al. "Anomaly-Based Intrusion Detection From Network Flow Features Using Variational Autoencoder" in IEEE Access, 2020, vol. 8, pp. pp. 13.

Nguyen et al. "GEE: A Gradient-based Explainable Variational Autoencoder for Network Anomaly Detection" IEEE Conference on Communications and Network Security: Jun. 2019; pp. 9.

Yao et al. "Unsupervised Anomaly Detection Using Variational Auto-Encoder based Feature Extraction" 2019 IEEE International Conference on Prognostics and Health Management (ICPHM) pp. 7.

Zimmerer et al. "Context-encoding Variational Autoencoder for Unsupervised Anomaly Detection" https://arxiv.org/abs/1812.05941: 2018; pp. 13.

Klys et al. "Learning Latent Subspaces in Variational Autoencoders" https://arxiv.org/abs/1812.06190; Published as a conference paper at NeurIPS 2018: pp. 15.

Wei et al. "Variations in Variational Autoencoders—A Comparative Evaluation" Aug. 2020 IEEE Access PP(99):1-1; pp. 21.

Sara Torres Fernández "Designing Variational Autoencoders for Image Retrieval" Degree Project In Electrical Engineering, Second Cycle, Stockholm, Sweden 2018: https://kth.diva-portal.org>smash>get>diva2:1247857>FULLTEXT01.pdf pp. 61.

Wang et al. "Deep Learning for Anomaly Detection" WSDM '20: Proceedings of the 13th International Conference on Web Search and Data MiningJanuary 2020: Abstract Only.

Lecun et al. "The Mnist Database of handwritten digits" http://yann.lecun.com/exdb/mnist/ pp. 7.

\* cited by examiner

CHANGE DETECTION DEVICE AND RELATED METHODS

TECHNICAL FIELD

The present disclosure relates to the field of image processing, and more particularly, change detection in images such as geospatial image data and related methods.

BACKGROUND

Topographical models of geographical areas may be used for many applications. For example, topographical models may be used in flight simulators and for geographical planning activities. Furthermore, topographical models of man-made structures (e.g., cities) may be helpful in applications such as cellular antenna placement, urban planning, disaster preparedness and analysis, and mapping, for example.

Various types of topographical models are presently being used. One common topographical model is the digital elevation model (DEM). A DEM is a sampled matrix representation of a geographical area which may be generated in an automated fashion by a computer. In a DEM, coordinate points are made to correspond with a height or elevation value. Different types of DEMs include digital terrain models (DTMs) which represent the bare earth without any objects (e.g., vegetation and buildings), and digital surface models (DSMs) which represent the bare earth along with the objects (e.g., vegetation and buildings) thereon.

One particularly useful application of such models is image change detection. One example approach for change detection is set forth in U.S. Pat. No. 11,238,307 to Delay et al., which is assigned to the present Applicant, discloses a system including a memory and a processor cooperating therewith to obtain geospatial image data from a plurality of different types of sensors and generate a three-dimensional (3D) geospatial model therefrom. The processor may further determine a reference image within the 3D geospatial model based upon synthetically positioning an image sensor within the 3D geospatial model, and perform change detection between a collected image and the reference image based upon semantic change detection using deep learning.

Despite the advantages of such systems, further developments in image change detection may be desirable in certain applications.

SUMMARY

A change detection device may include a variational autoencoder (VAE) configured to encode image data to generate a latent vector, and decode the latent vector to generate new image data. The change detection device may further include a controller configured to select a deep learning model from a plurality of different deep learning models based upon the new image data and a game theory reward matrix, and process the new image data using the selected deep learning model to detect changes therein.

In an example embodiment, the controller may include an analyzer configured to determine object and voxel data from the new image data, and a classifier configured to register the new image data to historical image data and determine changes thereto based upon the determined object and voxel data and the selected deep learning model. By way of example, the plurality of different deep learning models may include at least one of Adaptive Moment Estimation (ADAM), Stochastic Gradient Descent with Momentum (SGDM), and RMSProp deep learning models.

In one example implementation, the VAE may include an encoder configured to generate a mean vector and a standard deviation vector from the image data, and generate the latent vector from the mean vector and the standard deviation vector. In accordance with one example, the game theory reward matrix may be based upon a Kullback-Leibler (KL) divergence loss associated with the plurality of different deep learning model.

In an example embodiment, the controller may be configured to solve the game theory reward matrix using a linear program. By way of example, the image data may comprise geospatial image data.

A related method for change detection may include encoding image data using a VAE to generate a latent vector, and decoding the latent vector using the VAE to generate new image data. The method may further include selecting a deep learning model from a plurality of different deep learning models using a controller based upon the new image data and a game theory reward matrix, and processing the new image data using the controller with the selected deep learning model to detect changes therein.

A related non-transitory computer-readable medium is for a change detection device including a VAE and having computer-executable instructions for causing a controller of the change detection device to perform steps including causing the VAE to encode image data to generate a latent vector and decode the latent vector to generate new image data, and selecting a deep learning model from a plurality of different deep learning models based upon the new image data and a game theory reward matrix. A further step may include processing the new image data using the selected deep learning model to detect changes therein.

DETAILED DESCRIPTION

Figure 1:
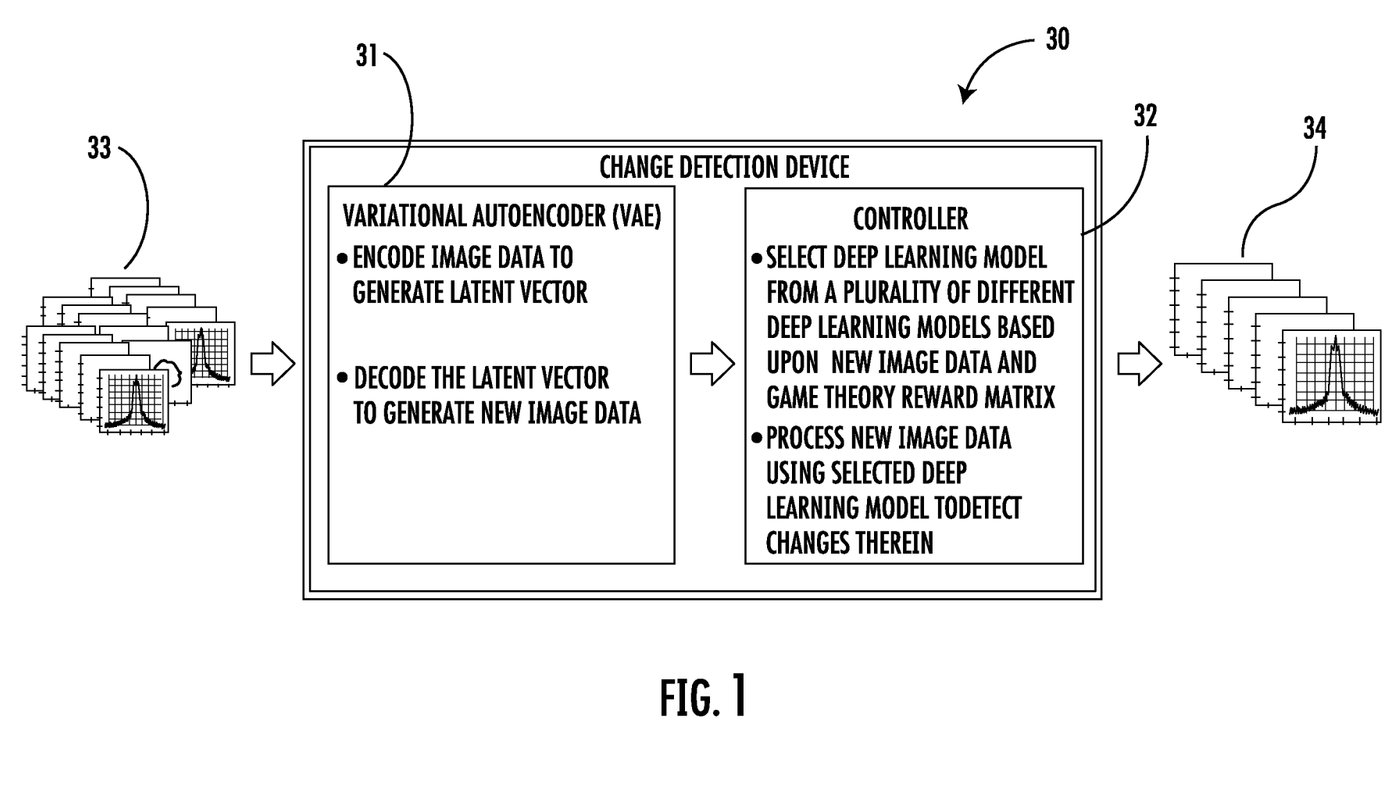
FIG. 1 is a schematic block diagram of a computing device according to an example embodiment.

Referring initially to FIG. 1, a change detection device 30 is now described which may be used for processing image data 33 with a selected deep learning model to detect changes therein. The change detection device 30 illustratively includes a variational autoencoder (VAE) 31 configured to encode image data to generate a latent vector, and decode the latent vector to generate new image data. The change detection device 30 further illustratively includes a controller 32 configured to select a deep learning model from among a plurality of different deep learning models based upon the new image data and a game theory reward matrix, and process the new image data using the selected deep learning model to detect changes therein and optionally identify or output changed images 34. By way of example, the VAE 31 and controller 32 may be implemented using appropriate hardware (e.g., microprocessor, etc.) and non-transitory computer-readable medium having computer-executable instructions for performing the various operations described further below. The change detection device 30 may be implemented as a stand-alone computing device, or it may be distributed among one or more machines, such as in a cloud-computing configuration in some embodiments.

Generally speaking, the change detection device 30 optimizes latent space using VAEs to help change-detection processing. Pixel-level changes may be detected during training of deep learning networks. The latent space is optimized using game-theoretic methods to choose the best stochastic gradient descent solver for each pixel, and simulated data may also be generated with the VAE output. In some embodiments, the approach set forth herein may be implemented with an intellimatics knowledgebase to provide a unique engine for producing orthorectified, solar shadow/reflectance corrected, time-filtered input to a fully automated change-detection process, for example.

By way of background, current change detection algorithms vary, but many use an entropy calculation to measure differences. Such change detection algorithms may benefit from using deep learning and game theoretic optimization. Furthermore, VAEs differ from regular autoencoders in that they do not use the encoding-decoding process to reconstruct an input. Instead, they impose a probability distribution on the latent space, and learn the distribution so that the distribution of outputs from the decoder matches that of the observed data. Then, they sample from this distribution to generate new data.

Figure 2:
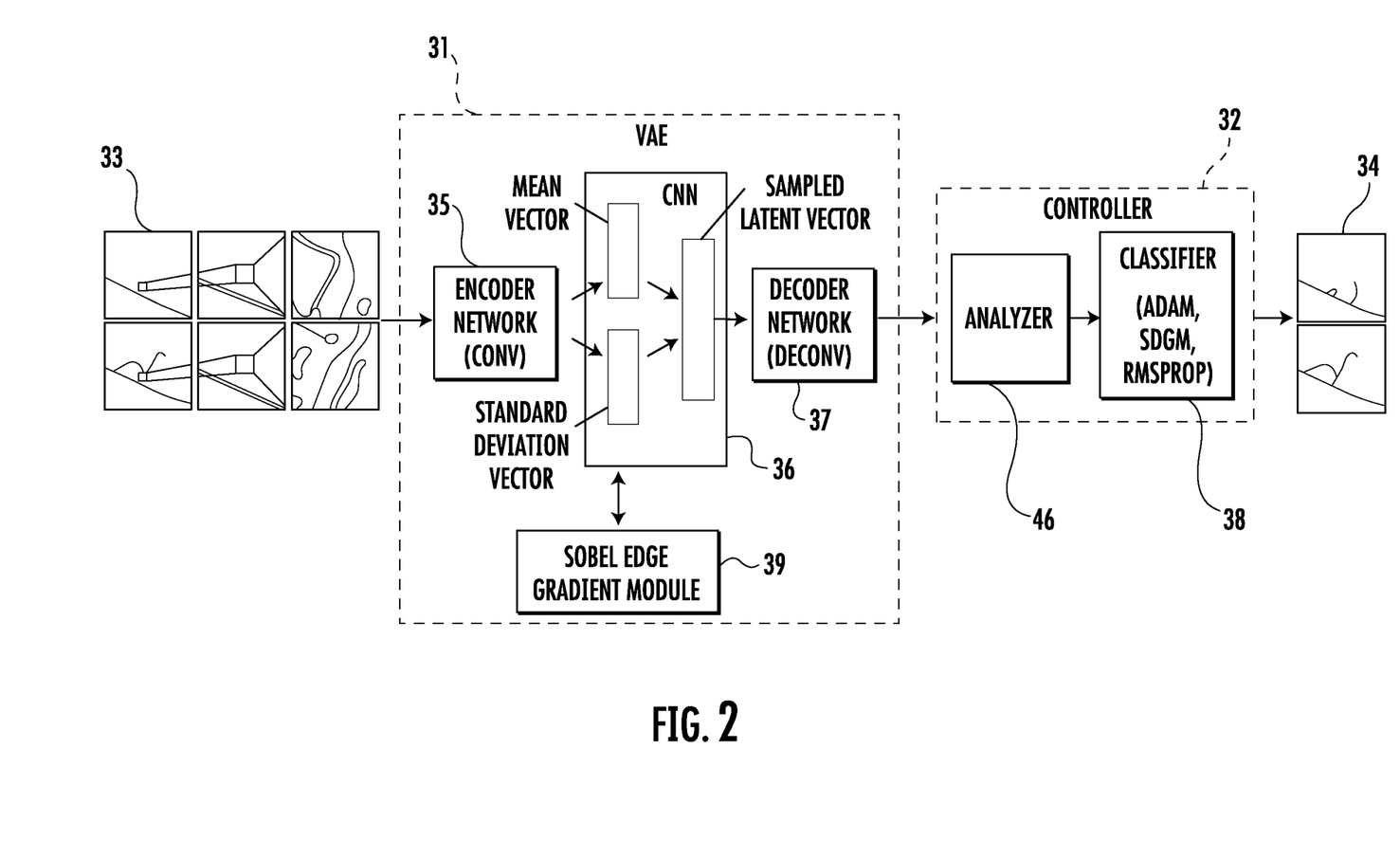
FIG. 2 is a schematic block diagram of an example implementation of the change detection device of FIG. 1.
Figure 3:
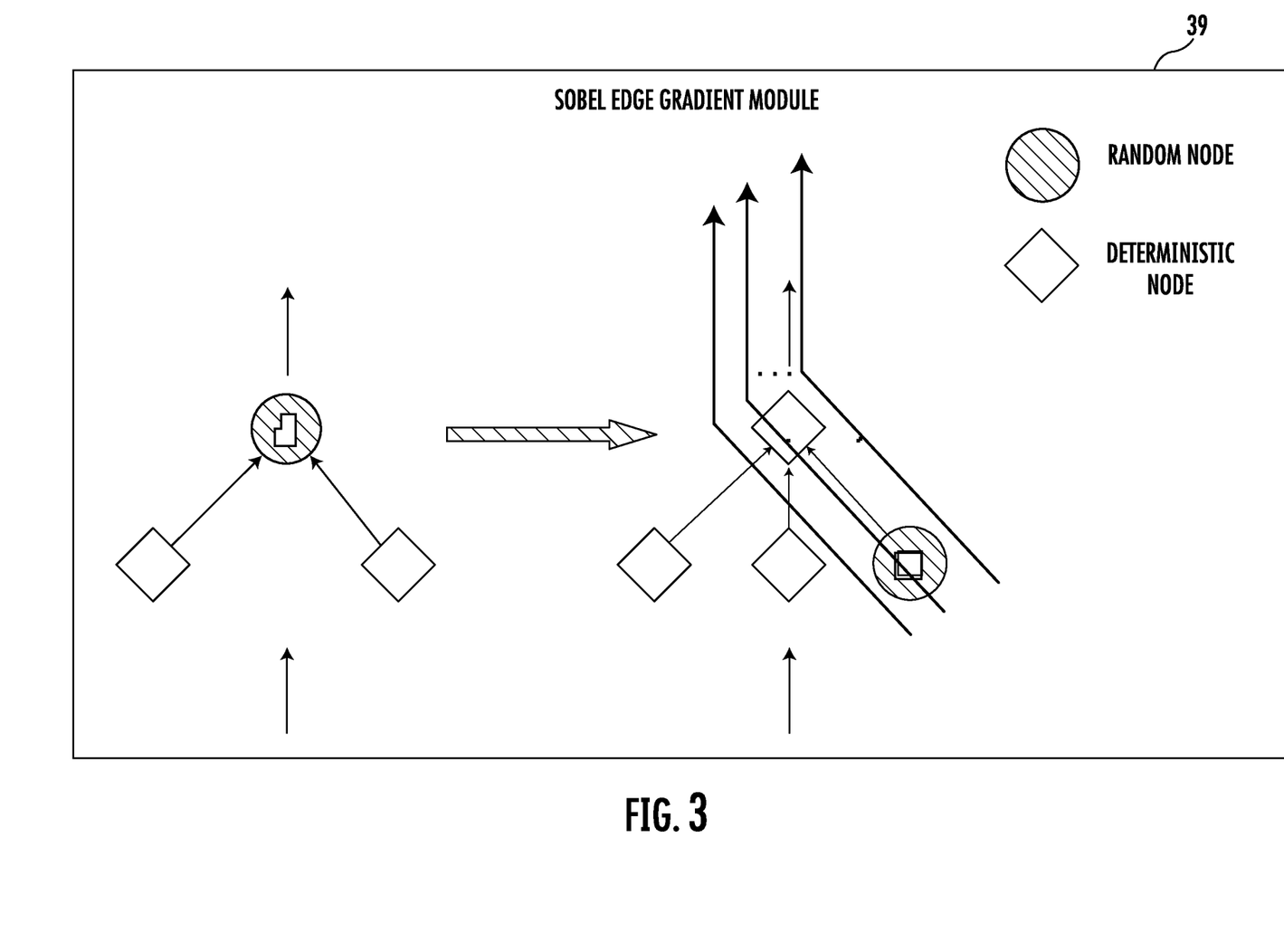
FIG. 3 is an example Sobel edge gradient module which may be used with the change detection device of FIG. 2.

Referring additionally to FIGS. 2 and 3, an example implementation of the change detection device 30 is now described. The VAE 31 illustratively includes an encoder 35 which learns to compress (reduce) a batch of input images 34 into an encoded representation of a normal distribution in latent space provided by a neural network 36 (e.g., a convolutional neural network, CNN). A decoder 37 learns to reconstruct the original data from the encoded representation to be as close to the original input as possible. The latent space is the layer that contains the compressed representation of the input data.

The VAE 31 differs from regular autoencoders in that it does not use the encoding-decoding process simply to reconstruct an input. Instead, the VAE 31 imposes a probability distribution on the latent space and learns the distribution so that the distribution of the outputs from the decoder 37 matches that of the observed data. The VAE 31 assumes that the source data has some sort of underlying probability distribution (such as Gaussian) and then attempts to find the parameters of the distribution.

The change detection device 30 advantageously provides an effective way to generate synthetic data for training machine learning (ML) applications, such as image change detection. In particular, this may be done while maintaining the underlying statistical properties of the original dataset, it may be applicable to sensitive datasets where traditional data masking falls short of protecting the data, and it may provide faster methods of generating synthetic training data for ML applications.

By way of background, a VAE is a generative system and serves a similar purpose as a generative adversarial network. One main use of a VAE is to generate new data that is related to the original source data by sampling from the learned distribution. Utilizing the learned distribution provides a way of generating synthetic data that is reflective of naturally occurring variations, rather than simply replicating existing data samples. This new synthetic data may be utilized for additional training and testing analysis. Moreover, a VAE may be considered a generative model which may randomly generate new samples based on the learned distribution. However, unlike traditional generative models that require strong assumptions regarding data structures and long inference times, a VAE makes weak assumptions of the data which also leads to faster training.

The VAE 31 forces input images onto an n-dimensional probability distribution (e.g., a 20-dimensional Gaussian in the present example), learns the associated parameters (e.g., the means and variances for a Gaussian distribution), and describes the data seen on image pixels with the resulting distribution. Synthetic data samples may be randomly generated from a probability distribution in latent space once the associated parameter value vectors are calculated.

The change detection device 30 may utilize a two-step process to generate synthetic data samples by (1) using the VAE 31 to learn the statistical properties of the original dataset(s) sampled from the Operational Design Domain (ODD); and (2) using the controller 32 as an optimizer for sampling the learned distribution and applying algorithmic transformations (e.g., rotations, reflections and attenuation) that enable building of richer datasets to support the ML model V&V process. More particularly, this approach provides an enhanced VAE-based process flow to learn the distribution and associated statistical properties of the original dataset (ideally the distribution of data in the ODD). Input data is provided, which in the present example includes geospatial images 33.

The image data 33 can represent any aspect or aspects of one or more devices and/or processes of a distributed system of interest. In the example of geospatial imagery, the data may take the form of a voxel representation including a descriptor stack of parameters such as pixel intensity, collection parameters, visibility, occlusion, solar angle, time existence, persistence, etc.

The VAE 31 further illustratively includes an optional image gradient Sobel edge detector 39 (FIG. 3), which is used for pre-processing. This helps the deep learning CNN models to learn more quickly and with more accuracy. The encoder 35 forces the input data (images 33) onto the multidimensional probability distribution. In accordance with one example implementation, a 20-dimensional Gaussian distribution may be used, although other distributions and dimensions may be utilized in different embodiments. The VAE 31 learns the means and variances of the data, and the resulting distribution describes the data.

The encoder 35 generates a compressed representation of the input data utilizing various weights and biases. Weights are the parameters within the neural network 36 that transform input data within the network's hidden layers. Generally speaking, the neural network 36 is made up of a series of nodes. Within each node is a set of inputs, weight, and a bias value. As an input enters the node, it gets multiplied by a weight value, and the resulting output is either observed or passed to the next layer in the neural network 36. The weights of the neural network 36 may be included within the hidden layers of the network. Within the neural network 36, an input layer may take the input signals and pass them to the next layer. Next, the neural network 36 includes a series of hidden layers which apply transformations to the input data. It is within the nodes of the hidden layers that the weights are applied. For example, a single node may take the input data and multiply it by an assigned weight value, then add a bias before passing the data to the next layer. The final layer of the neural network 36 is known as the output layer. The output layer often tunes the inputs from the hidden layers to produce the desired numbers in a specified range.

Weights and bias values are both learnable parameters inside the neural network 36. The neural network 36 may randomize both the weight and bias values before learning initially begins. As training continues, both parameters may be adjusted toward the desired values and the correct output. The two parameters differ in the extent of their influence upon the input data. At its simplest, bias represents how far off the predictions are from their intended value. Biases make up the difference between the function's output and its intended output. A low bias suggests that the neural network 36 is making more assumptions about the form of the output, whereas a high bias value makes less assumptions about the form of the output. Weights, on the other hand, can be thought of as the strength of the connection. Weight affects the amount of influence a change in the input will have upon the output. A low weight value will have no change on the input, and alternatively a larger weight value will more significantly change the output.

The compressed representation of the input data is called the hidden vector. The mean and variance from the hidden vector are sampled and learned by the neural network 36. Principal component analysis (PCA) of the hidden vector allows for the visualization of n-dimensional point clusters, e.g., 3-D point clusters, in the latent space. To make calculations more numerically stable, the range of possible values may be increased by making the network learn from the logarithm of the variances. Two vectors may be defined: one for the means, and one for the logarithm of the variances. Then, these two vectors may be used to create the distribution from which to sample.

More particularly, the neural network 36 takes mean and the variance encodings generated after passing the test images through the encoder network 35 and performs PCA on the matrix containing the encodings for each of the images. Furthermore, the neural network 36 visualizes the latent space defined by the means and the variances in the three dimensions characterized by the three first principal components, and initializes new encodings sampled from a normal distribution and outputs the images generated when these encodings pass through the decoder network 37.

The decoder 37 generates synthetic output data. The controller 32 functions as an optimizer which uses an ensemble of solvers with a game theoretic implementation to create an output image with least image reconstruction error. In the illustrated example, the controller 32 includes an analyzer 46 configured to determine object and voxel data from the new image data, and a classifier 38 configured to register the new image data to historical image data and determine changes thereto based upon the determined object and voxel data and the selected deep learning model.

More particularly, the controller 32 computes a gradient of loss function from the synthetic output data, and picks the best update based upon the ensemble of solvers provided by the classifier 38. More particularly, the optimization process is iterated via reparameterization to handle sampling of the hidden vector during backpropagation (an algorithm for training neural networks). In the illustrated example, an ensemble of models is generated using the three different solvers, namely an Adaptive Moment Estimation (ADAM) solver, a Stochastic Gradient Descent with Momentum (SGDM) solver, and a Root Mean Squared Propagation (RMSProp) solver, although different solvers may be used in different embodiments. The values from the loss function (evidence lower bound or ELBO, reconstruction, and Kullback-Leibler or KL loss) may be used in a game theoretic implementation to determine the optimal model to use per test sample. The loss is used to compute the gradients of the solvers.

In an example implementation, the VAE 31 may implement a loss step, in which it passes the encoding generated by the sampling step through the decoder network 37 and determines the loss, which is then used to compute the gradients. The loss in VAEs, also called the evidence lower bound (ELBO) loss, is defined as a sum of two separate loss terms: reconstruction loss+Kullback-Leibler (KL) loss or divergence. More particularly, reconstruction loss measures how close the decoder output is to the original input by using the mean-squared error (MSE). KL divergence measures the difference between two probability distributions. Minimizing the KL loss in this case means ensuring that the learned means and variances are as close as possible to those of the target (normal) distribution. The practical effect of including the KL loss term is to pack clusters learned due to reconstruction loss tightly around the center of the latent space, forming a continuous space from which to sample.

Example code for the encoder network 35 may be as follows:

```
encoderLG = layerGraph([
x imageInputLayer(imageSize,'Name','input_encoder','Normalization','none')
• convolution2dLayer(3,4,'Padding','same','Name','conv_1')
x batchNormalizationLayer('Name','BN_1')
x reluLayer('Name','relu_1')
• maxPooling2dLayer(1,'Stride',1, 'Name','max1')
x convolution2dLayer(3,8,'Padding','same','Stride',2, 'Name','conv_2')
• batchNormalizationLayer('Name','BN_2')
x reluLayer('Name','relu_2')
x maxPooling2dLayer(1,'Stride', 1, 'Name','max2')
• convolution2dLayer(3,16,'Padding','same','Stride',2,'Name','conv_3')
x batchNormalizationLayer('Name','BN_3')
• reluLayer('Name','relu_3')
• maxPooling2dLayer(1,'Stride', 1, 'Name','max3')
• convolution2dLayer(3,32,'Padding','same','Stride',2,'Name','conv_4')
```

```
encoderLG = layerGraph([
```
• batchNormalizationLayer('Name','BN_4')
• reluLayer('Name','relu_4')
x maxPooling2dLayer(1,'Stride', 1, 'Name','max4')
• convolution2dLayer(3,64,'Padding','same','Stride',2,'Name','conv_5')
x batchNormalizationLayer('Name','BN_5')
• reluLayer('Name','relu_5')
• maxPooling2dLayer(1,'Stride', 1, 'Name','max5')
x convolution2dLayer(3,128,'Padding','same','Stride',2,'Name','conv_6')
• batchNormalizationLayer('Name','BN_6')
x reluLayer('Name','relu_6')
• fullyConnectedLayer(2*latentDim,'Name','fc')]);

Furthermore, code for the decoder network 37 may be as follows:

```
decoderLG = layerGraph([
```
imageinputLayer([1 1 latentDim],'Name' 'i','Normalization','none')
transposedConv2dLayer(3, 64, 'Cropping', 'same', 'Stride', 2, 'Name', 'transpose1')
reluLayer('Name','relu1')
transposedConv2dLayer(3, 32, 'Cropping', 'same', 'Stride', 2, 'Name', 'transpose2')
reluLayer('Name','relu2')
transposedConv2dLayer(3, 16, 'Cropping', 'same', 'Stride', 2, 'Name', 'transpose3')
reluLayer('Name','relu3')
transposedConv2dLayer(3, 8, 'Cropping', 'same', 'Stride', 2, 'Name', 'transpose4')
reluLayer('Name','relu4')
transposedConv2dLayer(3, 4, 'Cropping', 'same', 'Stride', 2, 'Name', 'transpose5')
reluLayer('Name','relu5')
transposedConv2dLayer(3, 2, 'Cropping', 'same', 'Stride', 2, 'Name', 'transpose6')
reluLayer('Name','relu6')
transposedConv2dLayer(3, 1, 'Cropping', 'same', 'Stride', 2, 'Name', 'transpose7')
]);

The controller 32 creates a reward matrix, with pixel values and different solvers. The reward matrix may be an M×C matrix, where M is the number of models in the ensemble and C is the number of classes. In the example implementation, one model is used for each solver, for a total of three models, namely ADAM, SGDM, and RMSProp. The controller 32 solves the matrix for each pixel and the reward matrix uses reconstruction and KL loss scores, or responses based on number of pixel values to determine a goodness of fit. Scores in a linear program may be used to optimally choose which deep learning model to use per pixel. The matrix is constructed and solved with a linear program such as an interior-point algorithm, e.g., the primal-dual method, which may be feasible for convergence. A primal standard form may be used to calculate optimal tasks and characteristics as follows:

maximize f(x)s.t.

$Ax \leq b$ $x \geq 0$

Figure 4A:
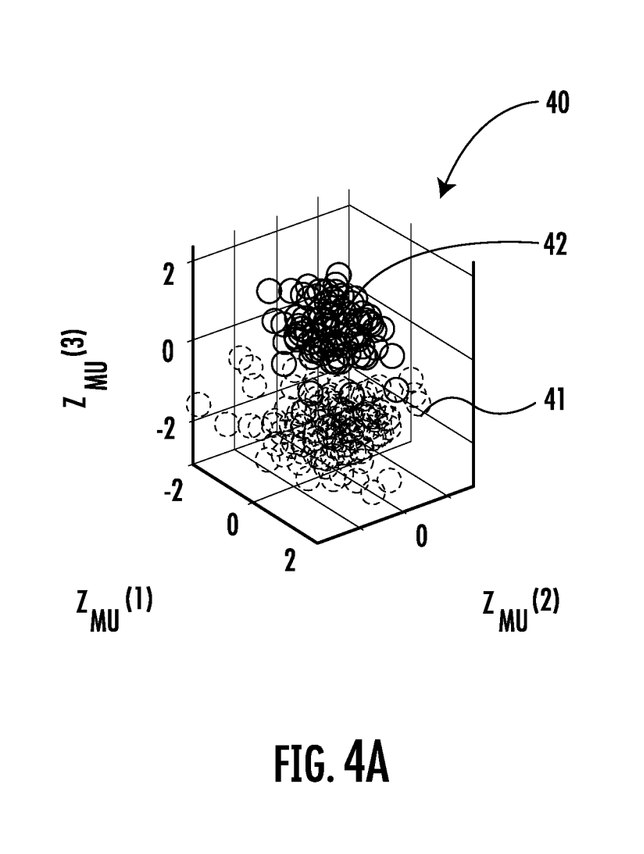
FIGS. 4A and 4B are before and after graphs, respectively, showing changes in image data by the device of FIG. 3.
Figure 4B:
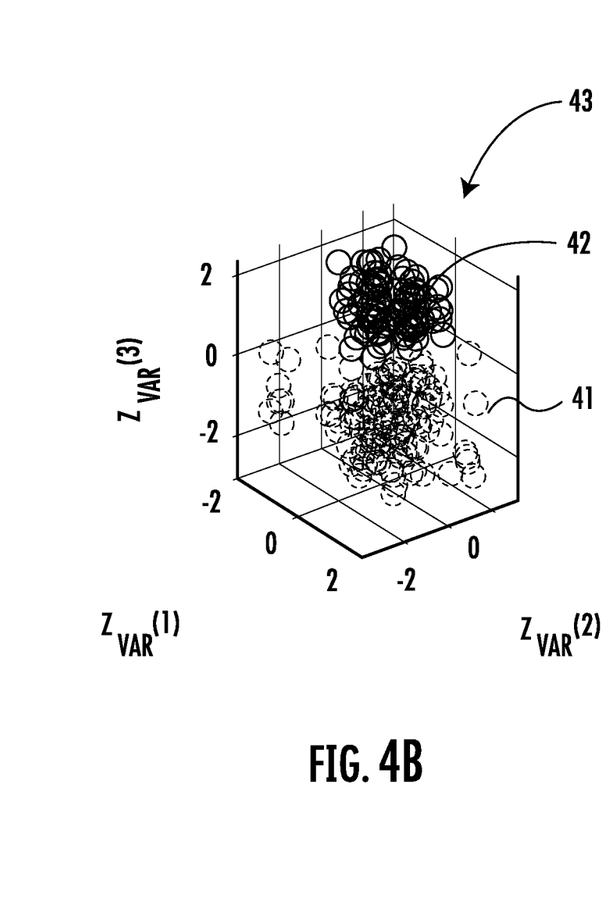
Figure 5A:
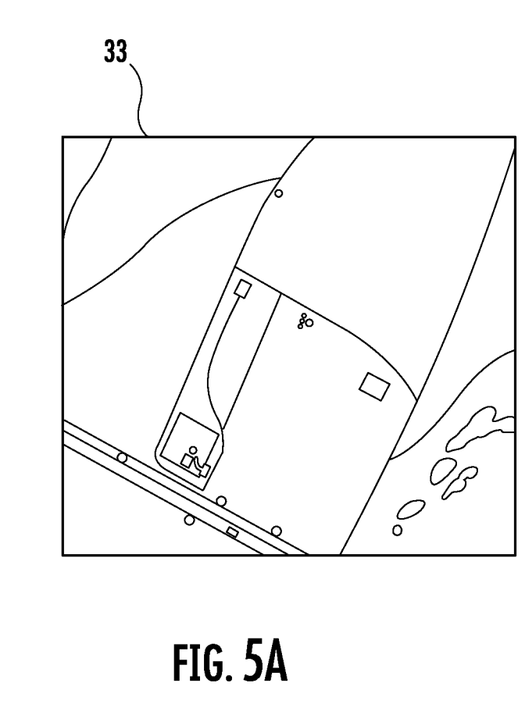
FIGS. 5A and 5B are digital elevation model (DEM) views illustrating the use of a change mask to highlight areas of changes in DEM image data by the change detection device of FIG. 1.
Figure 5B:
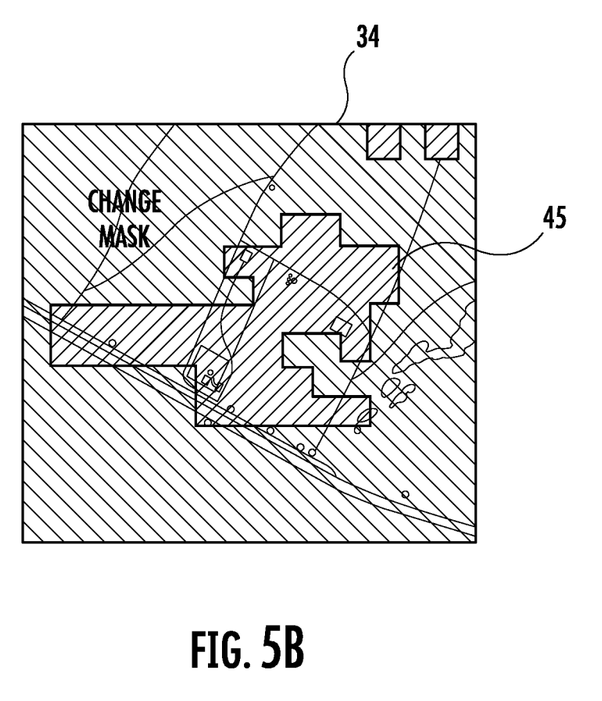
Figure 6A:
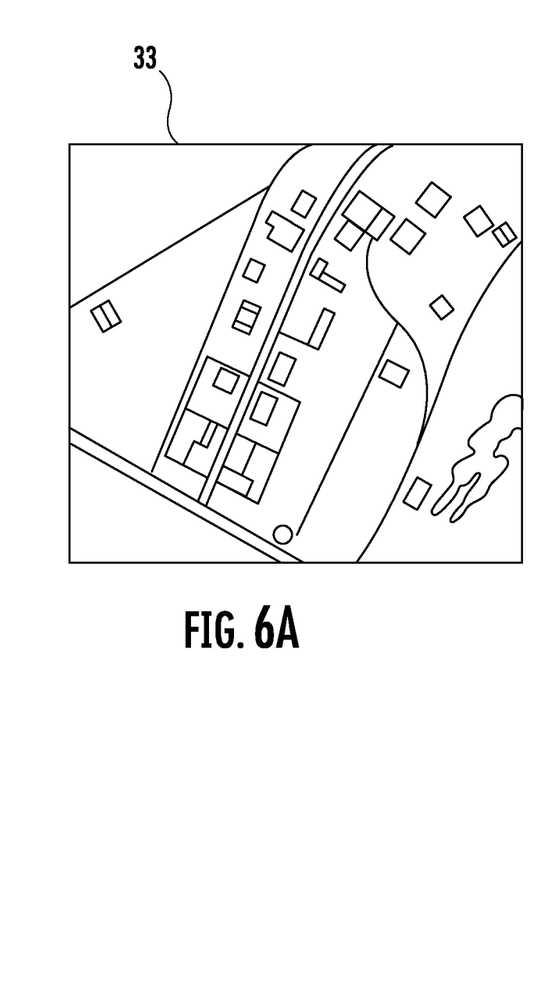
FIGS. 6A and 6B are another set of DEM views illustrating the use of a change mask to highlight areas of changes in DEM image data by the change detection device of FIG. 1.
Figure 6B:
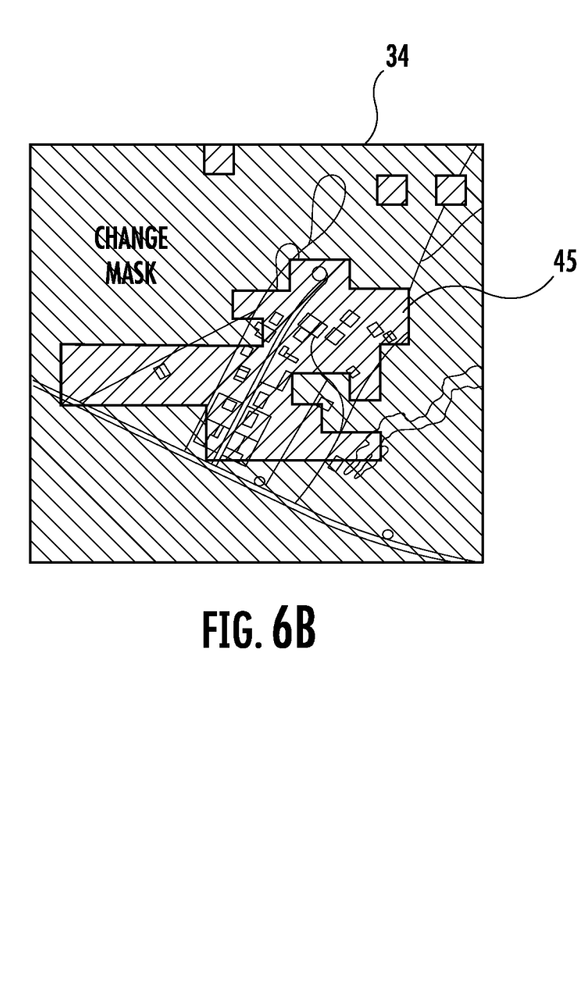

An example of latent space change detection is illustrated in the 3D plots 40 and 43 of FIGS. 4A and 4B at first and second times, respectively. At the first time (plot 40), a certain number of data points 41 at the bottom of the plot correspond to changed pixels, while the point 42 at the top of the plot represent unchanged pixels. At the second time (plot 43), more changes have occurred, resulting in less unchanged plot points 42 and more changed plot points 41.

Examples of change detection are shown in FIGS. 5A, 5B and 6A, 6B. In both of these examples, the geospatial image 33 is provided as an input to the device 30, and the output image 34 includes a change mask 45 overlayed on the image to show regions or points where change has been detected.

It should be noted that a change mask need not be continuous, and may encompass several spaced-apart pixel regions within the image 34 as shown. It should be noted that a change mask 45 need not be provided in all embodiments, and that other suitable approaches for illustrating changes in the images 33 may be used as well.

Figure 7A:
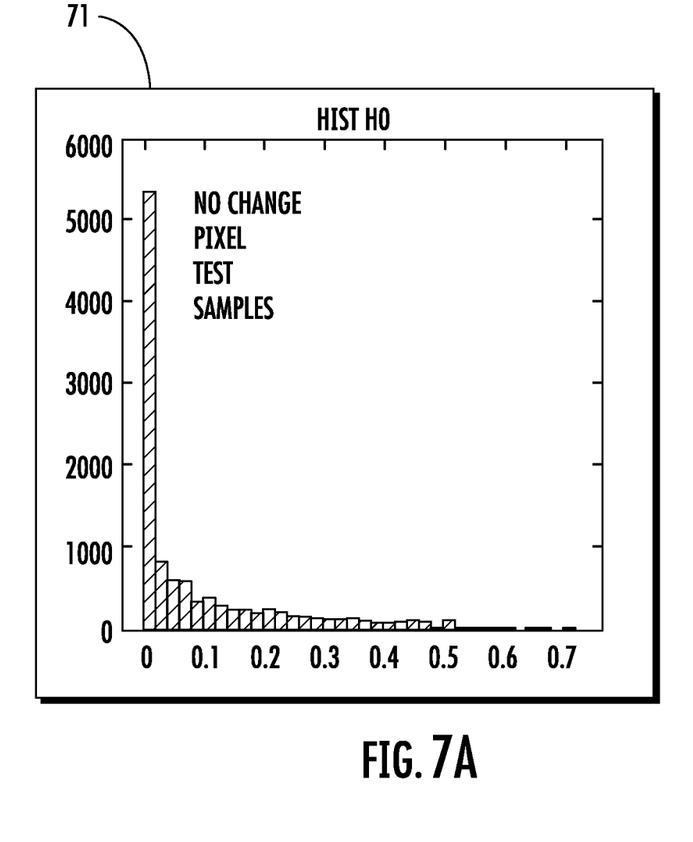
FIGS. 7A and 7B are histograms illustrating test samples in which no change was detected, and where change was detected, respectively, in accordance with an example embodiment.
Figure 7B:
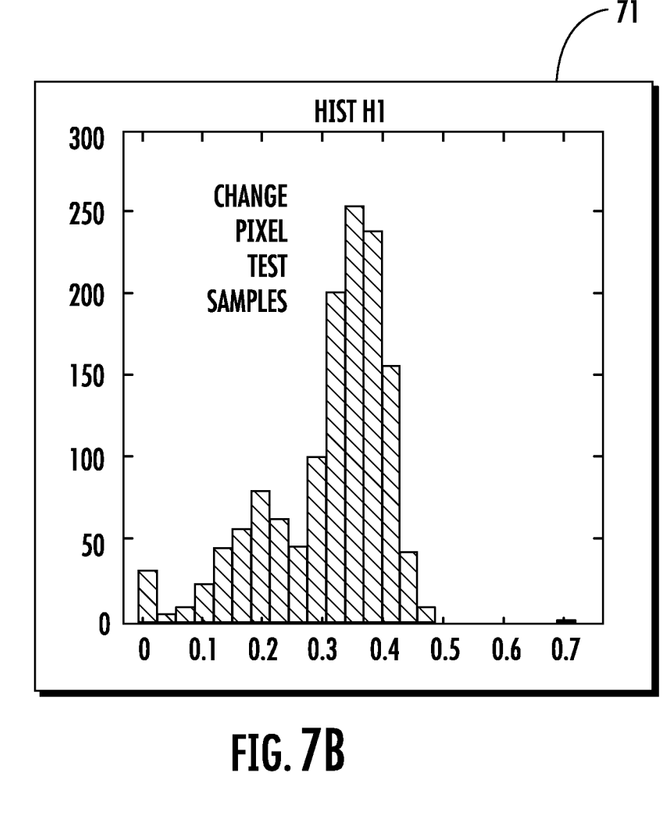

Referring additionally to FIGS. 7A and 7B, example histograms 71 and 72 showing unchanged/changed pixel test samples, respectively, are now described. A zTest may be used to determine if the new signal distribution belongs to any existing distributions. The controller 32 may loop through all distributions and keep the highest p value for each zTest. A high p value means that the new distribution is already in the training data. Then, the controller 32 subtracts 1 from these scores for H0 and H1. More particularly, the graph 71 (H0) represents the values that do not belong to the new data distribution. Furthermore, the graph 72 (H1) represents the values that do belong to the new data distribution.

Figure 8:
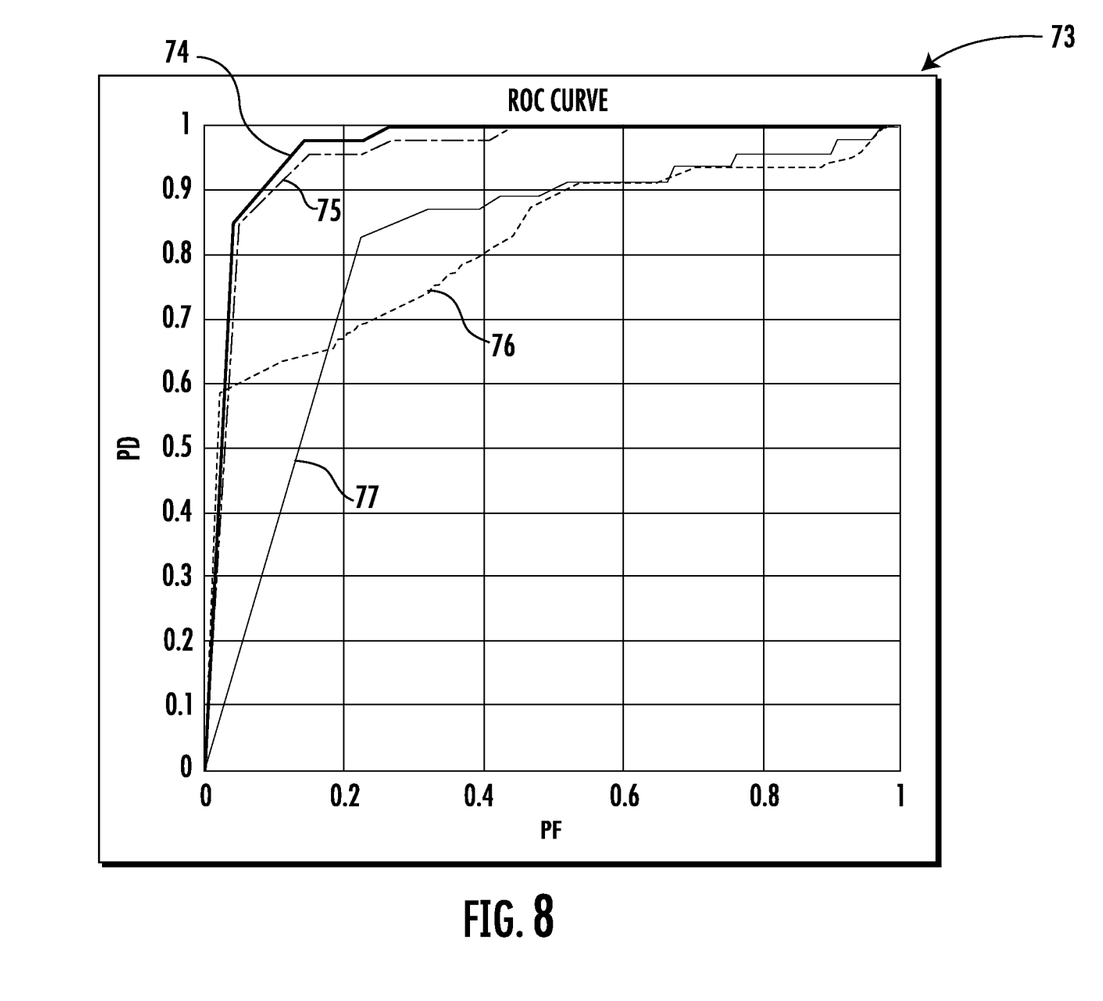
FIG. 8 is a Receiver Operator Characteristic (ROC) curve illustrating expected results for change analysis on image data from different solvers in an example embodiment.

Furthermore, a ROC curve 73 illustrated in FIG. 8 provides a plot of all threshold H0 and H1 values, in which the y-axis is the probability of detection (PD) and the x-axis is the probability of false alarm (PF). In the illustrated example, the plot 74 is for game theory, the plot 75 corresponds to SGDM, the plot 76 corresponds to ADAM, and the plot 77 corresponds to RMS Propagation. Of the three solvers, SGDM is the best performing model in this particular case and accordingly would be selected as the deep learning model for change detection.

The above-described approach advantageously utilizes the VAE 31 for image change detection. This approach also allows for the use of image gradient and 2D convolution as pre-processing to input image patches, as well as an encoder-decoder architecture in deep learning convolutional neural network. Furthermore, use of game theoretic optimization helps select the best performing deep learning model with an ensemble of solvers (e.g., SGDM, ADAM, RMSProp) to find minimum cost function loss (error). The present approach may provide further advantages including: providing a 3D p-value statistical test to measure anomaly detection accuracy and may represent results with ROC curves; automatically selecting a 3D view of latent space clusters that shows most separation of test hypotheses; and calculation of the probability of the most likely latent space cluster to which new sample image might belong to the latent space distribution.

Figure 9:
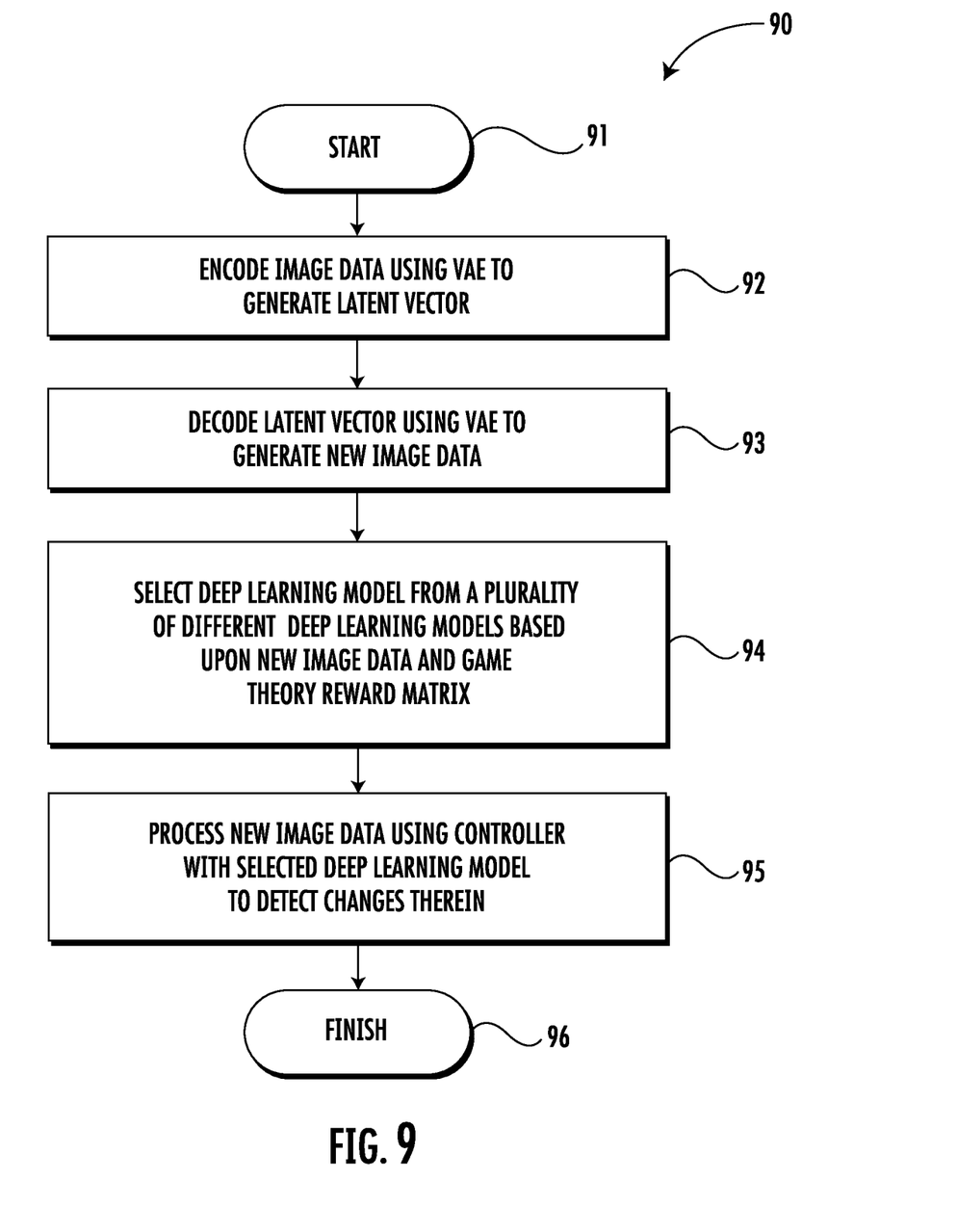
FIG. 9 is a flow diagram illustrating example method aspects associated with the change detection device of FIG. 1.

Turning now to the flow diagram 90 of FIG. 9, beginning at Block 91, a related method for change detection illustratively includes encoding image data using a VAE to generate a latent vector, at Block 92, and decoding the latent vector using the VAE to generate new image data, at Block 93. The method further illustratively includes selecting a deep learning model from a plurality of different deep learning models using the controller 32 based upon the new image data and a game theory reward matrix, at Block 94, and processing the new image data using the controller with the selected deep learning model to detect changes therein, at Block 95, as discussed further above. The method of FIG. 9 illustratively concludes at Block 96.

A related non-transitory computer-readable medium is for a change detection device 30 including a VAE 31 and having computer-executable instructions for causing a controller of the change detection device to perform steps including causing the VAE to encode image data to generate a latent vector and decode the latent vector to generate new image data, and selecting a deep learning model from a plurality of different deep learning models based upon the new image data and a game theory reward matrix. A further step may include processing the new image data using the selected deep learning model to detect changes therein, as discussed further above.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

The invention claimed is:

1. A change detection device comprising:
a variational autoencoder (VAE) configured to encode image data to generate a latent vector, and decode the latent vector to generate new image data; and
a controller configured to
select a deep learning model from a plurality of different deep learning models based upon the new image data and a game theory reward matrix, and
process the new image data using the selected deep learning model to detect changes therein.

2. The change detection device of claim 1 wherein the controller comprises:
an analyzer configured to determine object and voxel data from the new image data; and
a classifier configured to register the new image data to historical image data and determine changes thereto based upon the determined object and voxel data and the selected deep learning model.

3. The change detection device of claim 1 wherein the plurality of different deep learning models comprises one of Adaptive Moment Estimation (ADAM), Stochastic Gradient Descent with Momentum (SGDM), and RMSProp deep learning models.

4. The change detection device of claim 1 wherein the VAE comprises an encoder configured to generate a mean vector and a standard deviation vector from the image data, and generate the latent vector from the mean vector and the standard deviation vector.

5. The change detection device of claim 1 wherein the game theory reward matrix is based upon a Kullback-Leibler (KL) divergence loss associated with the selected deep learning model.

6. The change detection device of claim 1 wherein the controller is configured to solve the game theory reward matrix using a linear program.

7. The change detection device of claim 1 wherein the image data comprises geospatial image data.

8. A method for change detection comprising:
encoding image data using a variational autoencoder (VAE) to generate a latent vector;
decoding the latent vector using the VAE to generate new image data;
selecting a deep learning model from a plurality of different deep learning models using a controller based upon the new image data and a game theory reward matrix; and
processing the new image data using the controller with the selected deep learning model to detect changes therein.

9. The method of claim 8 wherein the controller comprises an analyzer and a classifier, and further comprising:
determining object and voxel data from the new image data using the analyzer; and
registering the new image data to historical image data and determining changes thereto based upon the determined object and voxel data and the selected deep learning model using the classifier.

10. The method of claim 8 wherein the plurality of different deep learning models comprises one of Adaptive Moment Estimation (ADAM), Stochastic Gradient Descent with Momentum (SGDM), and RMSProp deep learning models.

11. The method of claim 8 wherein encoding comprises generating a mean vector and a standard deviation vector from the image data, and generating the latent vector from the mean vector and the standard deviation vector.

12. The method of claim 8 wherein the game theory reward matrix is based upon a Kullback-Leibler (KL) divergence loss associated with the selected deep learning models.

13. The method of claim 8 wherein selecting comprises solving the game theory reward matrix using a linear program.

14. The method of claim 8 wherein the image data comprises geospatial image data.

15. A non-transitory computer-readable medium for a change detection device including a variational autoencoder (VAE) and having computer-executable instructions for causing a controller of the change detection device to perform steps comprising:
causing the VAE to encode image data to generate a latent vector, and decode the latent vector to generate new image data;

selecting a deep learning model from a plurality of different deep learning models based upon the new image data and a game theory reward matrix; and processing the new image data using the selected deep learning model to detect changes therein.

16. The non-transitory computer readable medium of claim 15 further having computer-executable instructions for causing the controller of the change detection device to perform steps comprising:

determining object and voxel data from the new image data; and registering the new image data to historical image data and determine changes thereto based upon the determined object and voxel data and the selected deep learning model.

17. The non-transitory computer readable medium of claim 15 wherein the plurality of different deep learning models comprises one of Adaptive Moment Estimation (ADAM), Stochastic Gradient Descent with Momentum (SGDM), and RMSProp deep learning models.

18. The non-transitory computer readable medium of claim 15 further having computer-executable instructions for causing the controller of the change detection device to cause the VAE to generate a mean vector and a standard deviation vector from the image data, and generate the latent vector from the mean vector and the standard deviation vector.

19. The non-transitory computer readable medium of claim 15 wherein the game theory reward matrix is based upon a Kullback-Leibler (KL) divergence loss associated with the selected deep learning model.

20. The non-transitory computer readable medium of claim 15 further having computer-executable instructions for causing the controller of the change detection device to solve the game theory reward matrix using a linear program.

21. The non-transitory computer readable medium of claim 15 wherein the image data comprises geospatial image data.

* * * * *